Nov. 24, 1970  E. W. FARMER ET AL  3,543,228
SONOBUOY SUSPENSION SYSTEM
Filed April 21, 1969
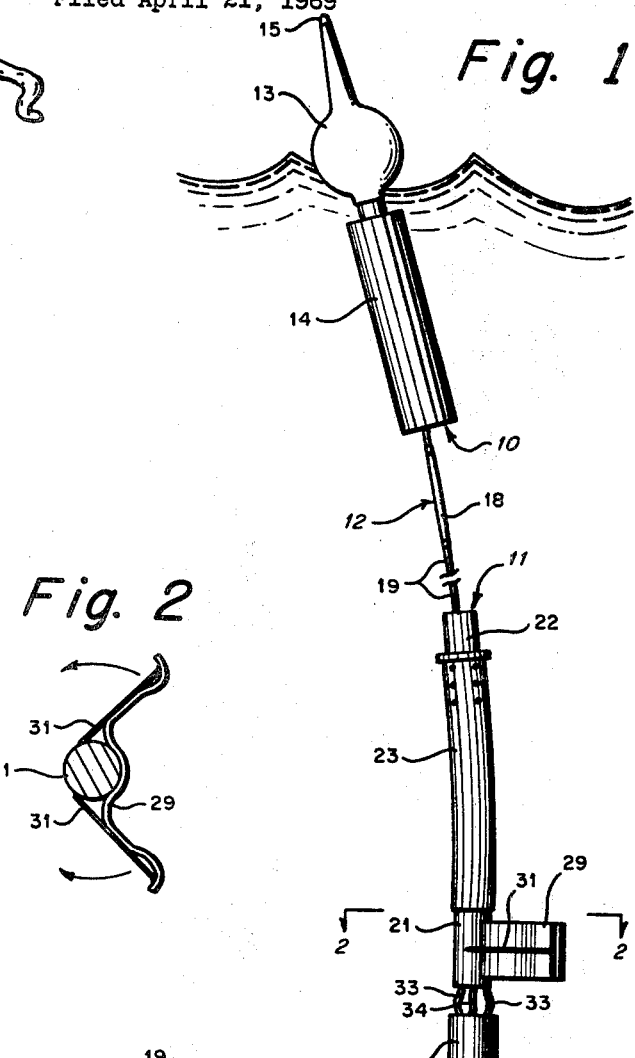
Fig. 1
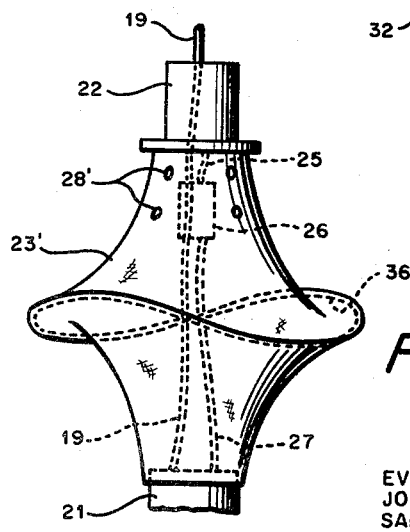
Fig. 2
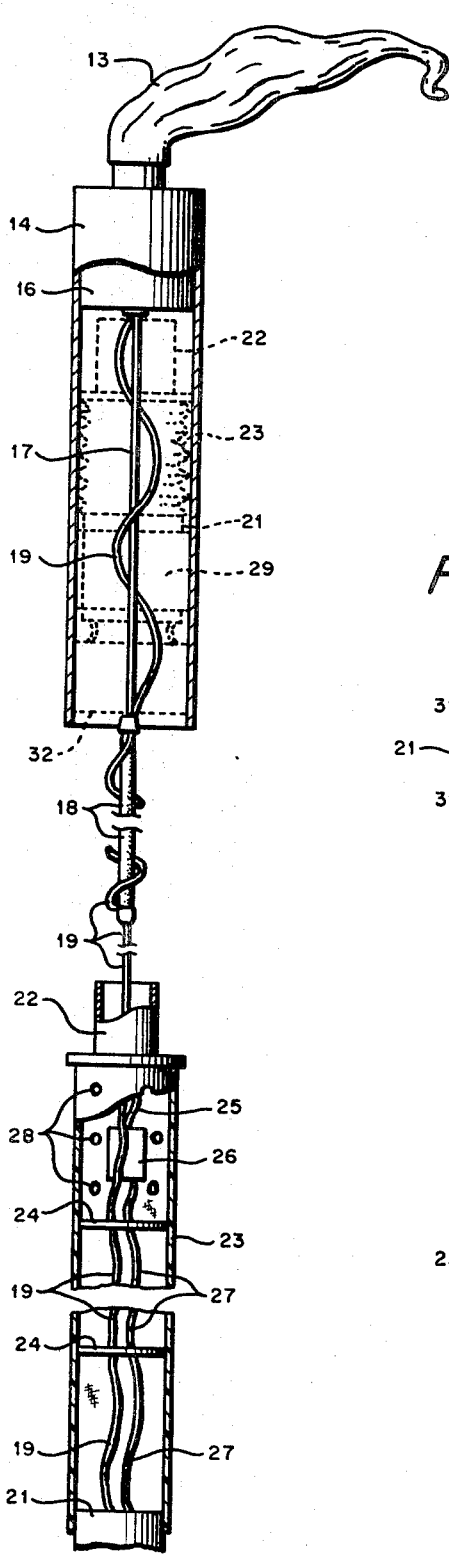
Fig. 3
Fig. 4
INVENTORS
EVERETT WALTER FARMER
JOHN F. KASTER
SAMUEL S. BALLARD
BY
ATTORNEY

United States Patent Office

3,543,228
Patented Nov. 24, 1970

3,543,228
SONOBUOY SUSPENSION SYSTEM
Everett Walter Farmer and John F. Kaster, Nashua, and Samuel S. Ballard, Hollis, N.H., assignors, by mesne assignments, to the United States of America as represented by the Secretary of the Navy
Filed Apr. 21, 1969, Ser. No. 817,942
Int. Cl. B63b 21/52; H04b 1/59
U.S. Cl. 340—2                                    5 Claims

ABSTRACT OF THE DISCLOSURE

An air-launchable, free-floating sonobuoy having a deployable dynamic mass suspension system for reducing noise on the sonic signal caused by excessive water flow at the hydrophone in the lower unit. A cloth bag included in the lower unit fills with water during its deployment. The mass of the water enclosed in the bag constitutes a virtual mass which, added to the dry weight of the suspension system, substantially reduces the resonance frequency of the suspension system; and the enlarged bag substantially increases the lateral drag of the lower unit to decrease the velocity of the water passing the lower unit.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to underwater sound transducers and, more particularly, to suspension systems for free-floating sonobuoys. Air-launchable, free-floating sonobuoys of the prior art generally comprise an upper unit capable of floating at the water surface and a deployable, nonbuoyant lower unit depending from the upper unit by a flexible suspension cable. A sonobuoy of this type is disclosed in U.S. Pat. 3,093,808 to George J. Tatnall et al. A hydrophone in the lower unit transmits a sonic signal through the cable to a radio transmitter in the upper unit which, in turn, transmits the sonic signal on an RF carrier to a remote receiver.

Motion of the hydrophone relative to the ambient water usually produces a flow-induced broadband noise level in the sonic signal which seriously degrades system performance particularly as applied to the detection, identification and localization of low-frequency sound sources between 5 and 50 Hz. The water flow at the hydrophone when deployed to a desired ocean depth can be basically described as having two directional components: a vertical component resulting from hydrophone response to surface waves, and a lateral component due to different ocean currents (drift rates) and drag characteristics at the upper and lower units.

A common technique of the prior art to eliminate vertical motion is to reduce the resonance frequency of the suspension system below the lowest anticipated surface wave frequency to be encountered (about 0.05 Hz. for the highest sea state) by adding a highly compliant element in the cable between the upper and lower units, or by adding more mass to the lower unit. The resonance frequency of the suspension system can be expressed mathematically as:

$$f_r = \frac{1}{2\pi}\sqrt{\frac{k}{m}}$$

where:

$f_r$=resonance frequency, hertz,
$k$=spring constant of cable, lbs./ft., and
$m$=mass of lower unit, lb.-sec.$^2$/ft.

The amount of mass which can be added by prior art methods, of course, is limited by the elastic limit of the compliant element and by the size of the mass. The size limitation is particularly critical in air-launched sonobuoy systems.

Prior art techniques for eliminating the lateral component of ambient water flow use so-called sea anchors or the like connected to the lower unit. The sea anchor increasing the drag ratio of the lower unit to the upper unit to such an extent that the hydrophone drifts at substantially the same rate as the ambient water flow, and the upper unit drifts at substantially the same rate irrespective of the water flow at the surface. Prior art sea anchors usually require complicated mechanisms for their deployment and are limited to applications where size is not a major factor.

SUMMARY OF THE INVENTION

Accordingly, it is the general purpose of the present invention to provide an improved sonobuoy suspension system for eliminating excessive flow-induced noise in sonic signals by significantly reducing the velocity of the water at and relative to the hydrophone while maintaining weight and size parameters acceptable for and consistent with present and future air-launched sonobuoy configurations. It is also an object of the invention to provide an improved sonobuoy suspension system which can be compactly stored in a cylindrical container for launching from aircraft, and which can be deployed from the container into operational condition with the hydrophone at a desired water depth.

This is accomplished in the sonobuoy suspension system of the present invention by a cloth bag in the lower unit which, in a predeployment condition, is compactly stored in the sonobuoy cylinder, and which fills with water during deployment of the lower unit. The mass of the water thereby enclosed in the bag adds to the inertial mass of the lower unit and decreases the resonance frequency of the suspension system in the same manner as would the addition of a solid mass. The size of the bag when filled also substantially increases the drag of the lower unit. Reducing the resonance frequency to below the frequency of the surface wave motion under maximum sea state conditions and increasing the drag in the lower unit relative to the upper unit causes the lower unit to be maintained at substantially the same velocity as the ambient water. In one disclosed embodiment of the invention, the cloth bag is an elongated cylinder connected at one end to a cable payout spool and at the other end to a lower electronics cannister from which the hydrophone depends. A plurality of circular discs are spaced along the length of the bag to prevent accordian-like collapse of the bag and "water-hammer" type pulsations from occurring due to any possible vertical motion. The discs also help separate confronting internal surfaces of the bag while the water seeps into the bag. Another disclosed embodiment provides a cloth bag having an outer configuration describing two opposed frustums of right circular cones having their small diameters at distal ends. One end is secured to the cable payout spool and the lower end to the lower electronics cannister. A hoop spring in the bag at its widest girth helps separate confronting internal surfaces of the bag. A sea-activated battery for providing power to the lower unit is suspended within the upper portion of either bag, and enlarged openings in the bag adjacent to the battery ensure prompt exposure to sea water.

BRIEF DESCRIPTION OF THE DRAWING

FIG. 1 represents, in elevation, one embodiment of a sonobuoy suspension system according to the invention deployed in operational condition in sea water;

FIG. 2 represents an enlarged transverse view of a portion of the suspension system taken in cross-section along the line 2—2 of FIG. 1;

FIG. 3 represents an enlarged elongated view, partially cut away, of the suspension system of FIG. 1, and further illustrating the system in dotted outline packaged in a predeployed configuration; and FIG. 4 represents, in elevation, another embodiment of the sonobuoy suspension system according to the invention deployed in operational condition.

DESCRIPTION OF THE PREFERRED EMBODIMENTS

Sonar systems for remotely detecting underwater sounds utilize sonobuoys which vary widely in configuration, size, function and performance. Among these are the free-floating sonobuoys which drift with the ocean current while transmitting sonic signals to a remote receiver. FIG. 1 illustrates such a sonobuoy with a suspension system according to the invention deployed for operation in a water current moving toward the right, and having upper unit and a deployable lower unit indicated generally by the numerals 10 and 11 connected together by a deployable suspension cable 12. The upper unit 10 includes an inflatable flotation bag 13 attached to the upper end of a cannister 14 for providing buoyancy at the water surface sufficient to maintain the remaining portions of the sonobuoy suspended therefrom beneath the surface and for providing support structure to an antenna, not shown, and a flashing light 15. As shown in FIG. 3, cannister 14 contains a radio transmitter and sea-activated battery pack 16 in the upper portion with the antenna connected to the transmitter output. The lower portion of the cannister 14 is formed to receive, in a compact manner described hereinbelow, the lower unit 11 and suspension cable 12 when not deployed. Various manual and automatic techniques of the prior art may be used to inflate bag 13 and initiate deployment. One such automatic technique is disclosed in U.S. Pat. 3,093,808 supra. Of course, it is understood that the invention is not limited to air-launched sonobuoys or to automatic operation as disclosed in the patent.

The suspension cable 12 includes a flexible chafing cord 17 connected at one end to the pack 16 and, under tension, extends out just past the lower end of the cannister 14. The extended end is connected to one end of an elongated elastic member 18. A signal wire 19 is electrically connected at one end to the input of the transmitter in pack 16 and at the other end to the output of a cylindrical lower electronics pack 21 which houses a hydrophone preamplifier, multiplexer, compass and line driver electronics. The wire 19 is mechanically attached at a point along its length to the extended end of the chafing cord 17. The portion of wire 19 adjacent to the chafing cord 17 is slack when the cord is taut so that all tension and mechanical abrasion are taken by the chafing cord and not the wire.

Further along its length, the wire 19 is also mechanically attached to the other end of the elastic member 18 with sufficient slack to enable the elastic member 18 to stretch within its designed limits, due to wave motion of upper unit 10 relative to lower unit 11, without applying tension to the wire. To prevent entanglement and to reduce drag, the portion of wire 19 adjacent to the elastic member 18 is preferably wound or woven about the member 18.

Still further along its length, the wire 19 is mechanically attached to a hollow wire spool 22 which, in the predeployed condition, stores the wire portion connected between member 18 and spool 22 in an evenly wound fashion around the outside so that the wire will unreel as the lower unit 11 deploys to lower depths, and stores member 18 and adjacent wire 19 on the inside in the predeployed condition. The depth to which it deploys is determined by the length of wire 19 paid out from the spool 22.

Attached between the confronting ends of the spool 22 and lower electronics 21 is a sleeve-like damper bag 23 made of porous, water-permeable material such as porous fabric which fills with water when submerged and extended. The bag 23 is collapsible along its length in an accordion-like manner for compact storage within the cannister 14. A plurality of solid discs 24 equally spaced along the length of the bag and contiguously attached at their circumferences to the inner surface of the bag form separate noncommunicating compartments which help prevent "water hammer" type pulsations due to vertical excitation of the sonobuoy, and assist in filling the bag with water by separating confronting surfaces as it is extended. A sea-activated battery 26 is suspended by a string 25 within the uppermost compartment (nearest to the spool 22) of the bag 23 and furnishes electrical power through a wire 27 to the lower electronics pack 21 when immersed in sea water. The bag at the uppermost compartment is perforated with openings 28 in order to obtain rapid exposure during deployment of the battery 26 in the sea water.

Secured to the lower electronics pack 21 are a pair of resilient stabilizing fins 29, prebent to extend radially from the pack 21 forming thereby an acute dihedral angle therebetween when deployed in the water, as shown in FIG. 2. A pair of flexible strings 31 connected between the pack 21 and respective extremities of the stabilizers 29 limits deflection in high flow conditions to said dihedral angle. In the predeployed condition, the stabilizers 29 are furled up against the pack 29, as shown by the arrows in FIG. 2, for storage within container 14 of the upper unit 10. The stabilizers 29 help reduce flow-induced noise by preventing rotary oscillation or "strolling," increasing drag at the lower unit 11. They also reduce hydrophone tilt and rise or "flying" in shear current.

It is contemplated that a short lanyard, not shown, may be attached at one end to the lowermost disc 24 (nearest to pack 21) and terminate with a stabilizer release pin to retain the stabilizers 29 furled about the electronics pack 21 in the predeployed condition. During deployment, as the lower unit 11 clears the cannister 14 and damper bag 23 is extended, the lanyard will become taut and pull the release pin. The stabilizers swing open to their prebent, radially extended, deployed condition and orient the pack 21 with the stabilizers in trailing position. The release pin hangs inside the damper bag where it cannot tangle or create noise.

A hydrophone 32 is externally connected to the lower end of the electronics pack 21 by relatively short vibration-isolating flexible straps 33. A slack wire 34 connects the output of the hydrophone 32 to the input of the electronics pack 21. All elements of the suspension system are adapted to be compacted into the cannister 14 of the upper unit 10 in the manner shown in dotted outline in FIG. 3. The elastic member 18 is contained within the wire spool 22, wire 19 is completely wound about the outside of the spool 22, and damper bag 23 is collapsed along its length. It is contemplated that a retaining cap, not shown, be removably secured to the lower end of the cannister 14 and formed to be manually or automatically released at the desired deployment time.

FIG. 4 is another embodiment of the invention wherein damper bag 23' is utilized in the suspension system instead of the bag 23. The bag 23' can be described, when fully extended, as opposed upper and lower frusto-conical porous cloth sections joined at their widest diameters, and their smallest diameters connected, respectively, to the wire spool 22 and electronics pack 21. A resilient hoop 36, attached to the circumference of the bag 23' at its widest diameter helps separate confronting internal surfaces of the bag during deployment and increases the transverse cross-sectional area for vertical stabilization. The hoop 36 is resilient so that it can be compactly folded with the bag for insertion into the cannister 14. The sea-activated battery 26 is suspended by string 25 within the bag from the spool 22 and perforations 28' in the bag adjacent to the battery cause rapid exposure of the battery to sea water. One advantage of the conical bag configuration is that it will flow stabilize the system in lateral directions.

From the foregoing description some of the many advantages of the present invention should now be apparent. For example, with only a relatively small increase in dry weight and predeployment size, a sonobuoy dynamic mass suspension system is provided for attenuating flow-induced noises on sonic signals detected by the hydrophone. In an actual embodiment, the invention adds a virtual mass of twenty-eight pounds to the lower unit of the deployed suspension system thereby significantly decreasing its resonance frequency below the lowest anticipated frequencies caused by wave motion. Additionally, the invention significantly increases the drag area of the lower unit to a further aid in reducing flow noise. Though not limited thereto, the suspension system is particularly suitable for use in air-launched sonobuoys because it may be easily compacted into a size acceptable to present-day airborne launching apparatus.

Obviously many modifications and variations of the present invention are possible in light of the above teachings. It is therefore to be understood that within the scope of the appended claims the invention may be practiced otherwise than as specifically described.

The term "dynamic mass," as used herein, is meant to imply the effective virtual mass of the entire system, as opposed to the body mass.

This invention has been described in conjunction with a free-floating buoy system. Nevertheless, the described suspension system has been tested with buoy systems that are not free-floating. In particular, the surface buoys have been deployed from and attached by a connecting line to a ship, or the buoys have been moored to some other object. In addition, the principal embodied in the described suspension system may be used to isolate any unit suspended from a surface unit, for example, the suspended unit may be an active transponder or a viewing device such as a picture or television camera.

What is claimed is:

1. A dynamic mass suspension system for isolating a subsurface unit from forces acting upon a floating buoy, comprising:

a radio transmitter formed to be contained within the buoy;

suspension means having a flexible nonelastic electrically conductive line connected at one terminal to the input of said transmitter, and a flexible elastic element interposed along the length of said line;

a water-permeable collapsible container having closed ends and attached at one end to the other terminal of said suspension means and at least one enlarged opening in the side thereof;

spool means fixed to said one end of said container and formed to receive, in wound form, said line on the outside of said spool and to receive, in folded form, said elastic element on the inside of said spool;

sea-activated battery means contained within said container adjacent to said opening; and hydrophone means secured to the other end of said container and electrically connected to said battery and said other terminal.

2. A suspension system according to claim 1 further comprising:

said hydrophone means having an electronic unit fixed to said other end of said container, and a hydrophone connected in spaced relation by flexible straps to said electronic unit and the output thereof electrically connected to the input of said electronic unit.

3. A sonobuoy system according to claim 2 further comprising:

a cannister formed to be connected to the buoy for compactly receiving said cable means contained within and on said spool, said container said sea-activated battery, and said hydrophone means in a predeployed condition.

4. A suspension system according to claim 3 further comprising:

said container having an elongated sleeve-like configuration and a plurality of walls spaced along its length forming non-communicating chambers.

5. A suspension system according to claim 3 further comprising:

said container having a sleeve-like configuration with an enlarged cross-sectional area midway between its ends, and a resilient member secured at the periphery of said container at its enlarged area for urging said container to a maximum expanded position.

References Cited

UNITED STATES PATENTS

| 2,790,186 | 4/1957 | Carapellotti | 9—8 |
| 3,377,615 | 4/1968 | Lutes | 340—2 |

RICHARD A. FARLEY, Primary Examiner

U.S. Cl. X.R.

9—8